Aug. 28, 1923.

E. J. WILSON

ROTARY SPEED INDICATOR

Filed March 15, 1917

1,466,156

2 Sheets-Sheet 1

INVENTOR:
Emery J. Wilson.

Aug. 28, 1923.

E. J. WILSON 1,466,156

ROTARY SPEED INDICATOR

Filed March 15, 1917

2 Sheets-Sheet 2

INVENTOR:
Emery J. Wilson

Patented Aug. 28, 1923.

1,466,156

UNITED STATES PATENT OFFICE.

EMERY J. WILSON, OF CLEVELAND, OHIO.

ROTARY SPEED INDICATOR.

Application filed March 15, 1917. Serial No. 155,061.

*To all whom it may concern:*

Be it known that I, EMERY J. WILSON, citizen of United States, residing at Cleveland, in the county of Cuyahoga and State of Ohio, have invented certain new and useful Improvements in Rotary Speed Indicators, of which the following is a specification.

This invention relates to rotary speed indicators in which the speed of rotation is indicated by the action of centrifugal force of a liquid contained in a rotatable receptacle and it consists of a new device of new form and construction to which may be applied exact mathematical formalæ based on the laws of centrifugal force of liquids. The invention further embodies features which enable the vital proportions of the construction on which such calculations are based to be attained with exactness and ease of manufacture.

The essential elements of this invention comprise a rotatable receptacle having suitably arranged chambers and passages containing a liquid, and a movable scale member adapted to be moved by the deformations of the liquid due to its centrifugal force, the amount of movement of the scale from its initial position serving to indicate the speed of rotation of the receptacle.

My preferred form of construction comprises a fixed axial chamber, a receptacle adapted to rotate about said axial chamber, said receptacle having an annular discharge chamber concentric with the axis and passages connecting the two said chambers; a scale member having a cylindrical graduated surface and adapted to be rotated about the axis of the receptacle by means of a weight supported upon a mercury column contained in the axial chamber, said weight having both an axial movement, controlled by the rise and fall of said mercury column due to centrifugal action of the mercury, and a movement of rotation controlled by a groove formed in said fixed axial chamber; the shape of the groove being such that the scale member rotates through angles which are directly proportional to the speed of rotation of the receptacle.

Figure 3:
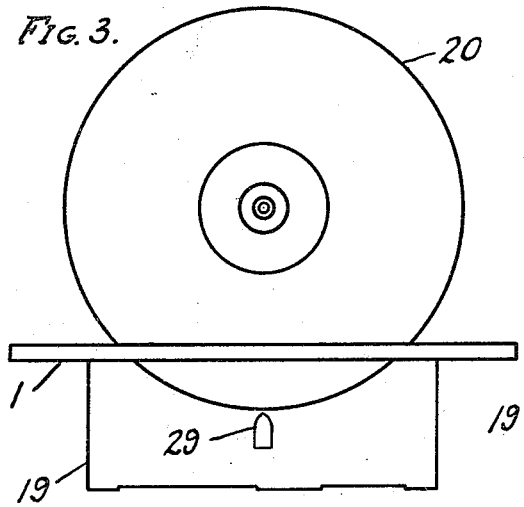
Figure 4:
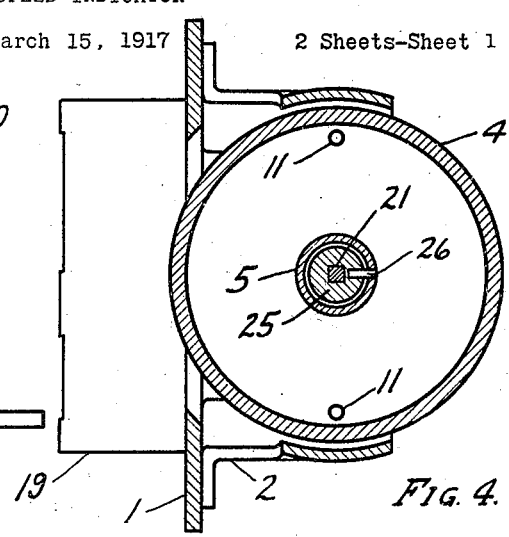
Figure 1:
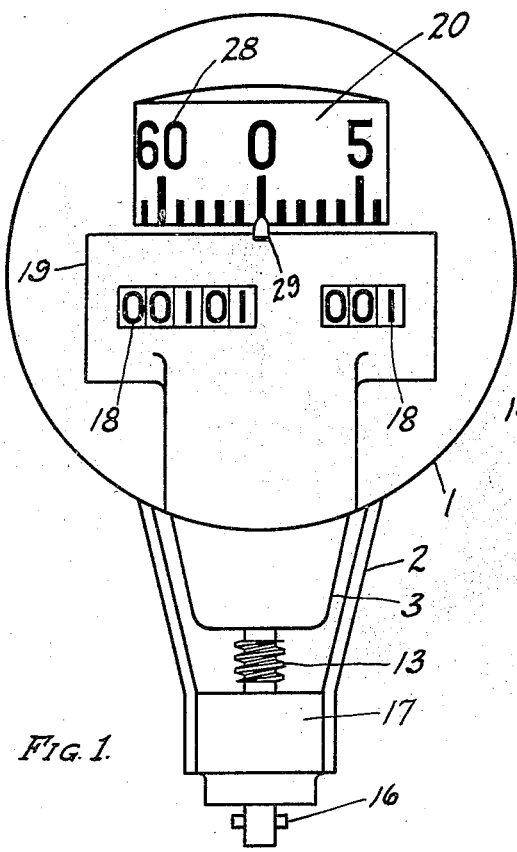
Figure 2:
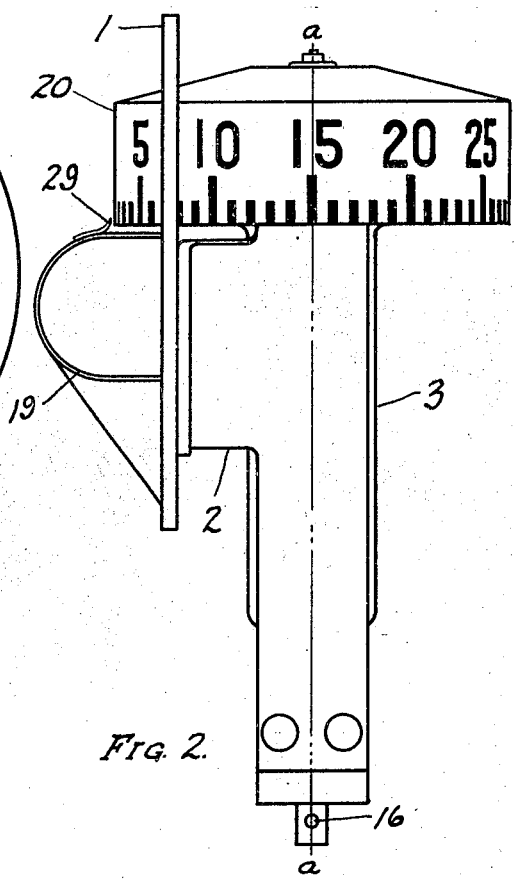
Figure 6:
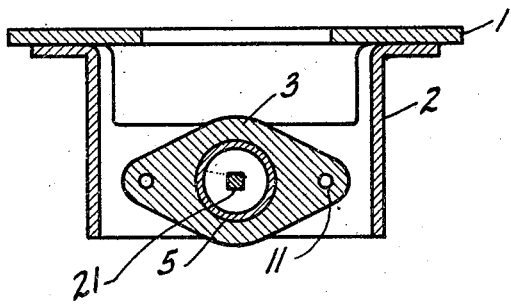
Figure 5:
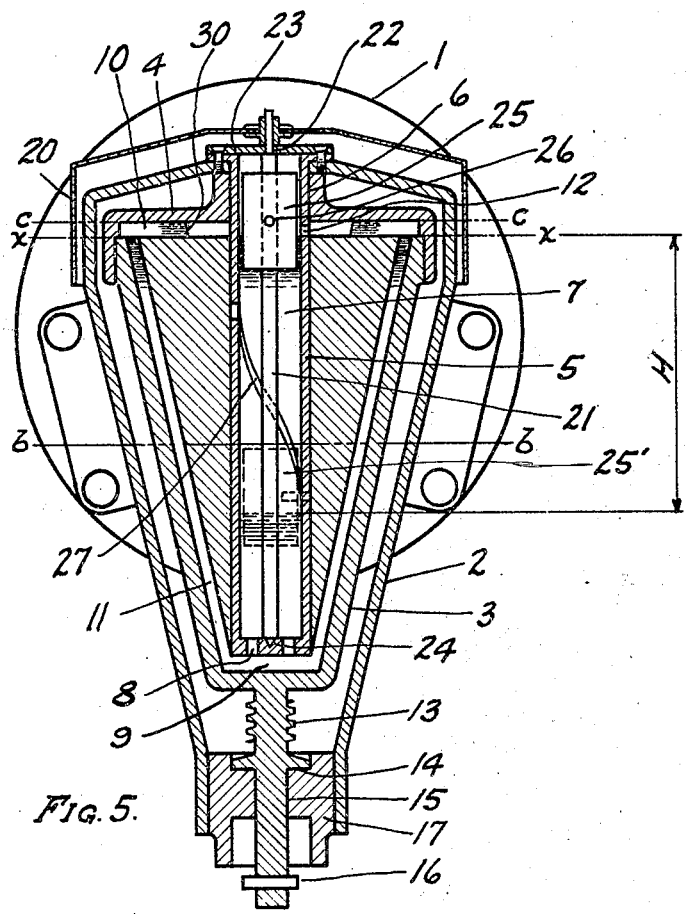

A convenient specific embodiment of my invention is illustrated in the accompanying drawings in which Figures 1, 2 and 3 are front and side elevations and plan respectively of the device assembled; Fig. 4 is a section on the line c—c of Fig. 5; Fig. 5 is a section on the line a—a of Fig. 2; and Fig. 6 is a section on the line b—b of Fig. 5.

In the figures, 1 indicates a face plate supporting the frame 2 which in turn supports the rotating unit comprising a body 3 and cap 4. A flanged tubular member 5, held fixed in frame 2, serves as a journal for the cap bearing 6 and extends downward into the body of the receptacle thereby forming a fixed axial chamber 7 about which the entire receptacle is free to rotate. The lower end of said tube is closed except for the passages 8 which unite the chamber 7 with the clearance space 9 under the end of the tube. An annular discharge chamber 10 is formed between the body 3 and cap 4, and inclined passages 11 join the chamber 10 and clearance space 9, so that there is a liquid communication between the axial chamber 7 and annular chamber 10. The tube 5 is further provided with a hole 12 for the passage of air between chambers 7 and 10. The lower end of the body 3 is provided with an extension forming a screw thread 13, a step bearing 14, a journal 15, and carries a cross pin 16 at its lower end for rotating the receptacle as, for example, by means of a flexible shaft (not shown). A bearing 17, supported by frame 2, receives the journal 15 and also serves to support the receptacle by means of the step 14. The screw thread 13 serves as a worm for driving the mechanism which operates the distance recording number wheels 18 shown enclosed in a suitable casing 19. Since this mechanism is of common use and does not concern this invention further detail and description is not deemed necessary. The cylindrical scale member 20 is supported upon and rotated by the spindle 21 having an upper journal 22 in the cross plate 23 fast to the frame 2, and a pivot bearing 24 in the lower end of the fixed tube 5. The spindle 21 is of square section and carries the weight 25 slidably mounted thereon, said weight being provided with a pin 26 which works in a spiral groove 27 formed in the fixed tube 5, so that as the weight moves up and down along the spindle, the weight, spindle and scale are all rotated by the pin following the groove. The scale member 20 is graduated upon its outer cylindrical surface and the numbers 28 on the scale indicate miles per hour as is customary in automobile practice. The face plate 1 has an opening through which a portion of the scale member protrudes, thereby exposing to view in the front elevation enough of the graduations and numbers to be easily read as the scale moves under the fixed index point 29.

The operation of the device is as follows: When the receptacle is not rotating, the axial chamber 7 and inclined passages 11 are filled with mercury to the level $x$—$x$, the weight is raised to its highest or initial position and the zero on the scale is opposite the index point 29 as shown in Fig. 1. When the receptacle is rotated at a given speed, the mercury assumes a new position of equilibrium due to the combined action of centrifugal force and gravity. The laws governing this action are known and definite. The mercury flows from the axial chamber 7 through the passages 11 and into the discharge chamber 10, its free surface assuming a position as shown at 30, and the top end of the axial column descends through a certain distance H, determined from formulæ based on the above mentioned laws, thereby permitting the weight to fall to the position 25' and at the same time to be rotated through a certain angle by the pin moving in the spiral groove. This rotation is communicated to the scale and the amount of the rotation is indicated on the scale opposite the index point 29. By determining the values of H for given speeds of rotation of the receptacle, and knowing the angular displacements of the scale member corresponding to these speeds, the spiral groove can be plotted accordingly. For a uniformly graduated scale the slope of the groove will ordinarily be variable throughout its length since the mercury surface in the axial chamber 7 does not descend through equal distances for uniform changes of speed.

As will be understood from the above, I have provided a speed indicator wherein a liquid mass is subjected to centrifugal action with the carrier for the mass formed with inner and outer chambers in permanent communication to receive the mass in a manner to locate a free surface of the mass in each of the chambers, the free surfaces being in permanent communication through the body of the mass, the wall of the inner chamber being non-rotative so that the free surface of that chamber is also non-rotative; also that the walls of the outer chamber traversed by the free surface of that chamber are of arbitrary contour—in the form of parallel plane surfaces extending normal to the axis of rotation—the arrangement being such that in operation, the positions of equilibrium of the mass produced at different speeds of rotation place the free surfaces relative to vortex characteristics of such dimensions that the vertex positions corresponding to equal increments of speed differ from each other in position by unequal distance amounts, the arbitrary form of the faces of the outer chamber permitting accurate determination of the positions of the vertex in response to predetermined speed values; and that the movements of a float carried by the free surface of the non-rotative portion of the mass are controlled in such manner that an indicating instrumentality rendered active by movements of the float will indicate equal increments of speed by equal travel of the instrumentality, this being provided, in the present invention, by operatively connecting the float, the wall of the inner chamber and the indicating element in such manner as to translate the rise and fall of the free surface of such inner chamber into rotative movement of the indicating element, with the operative structure including a spiral-like formation arranged to compensate for non-uniform lengths of travel of the indicating surface—the free-surface carrying the float—for speed increments of equal amount.

Having described my invention I claim as new—

1. A speed indicator, comprising an outer rotatable body having a chamber concentric with the axis of rotation, an inner fixed body about which said outer body rotates and which forms a wall of a chamber concentric with the axis of rotation and communicating with the chamber of the outer body, liquid in said chambers adapted to flow from chamber to chamber as the speed of rotation varies, the displacement of the liquid in the inner chamber serving to indicate variations in the speed of rotation, a float supported by the liquid in the inner chamber, and spirally disposed guiding connections between said float and the fixed inner body adapted to produce rotation of the float as the liquid rises and falls in the inner chamber.

2. A speed indicator, comprising an outer rotatable body having a chamber concentric with the axis of rotation, an inner fixed body about which said outer body rotates and also having a chamber concentric with the axis of rotation and communicating with the chamber of the outer body, liquid in said chambers adapted to flow from chamber to chamber as the speed of rotation varies, the displacement of the liquid in the inner chamber serving to indicate variations in the speed of rotation, a float supported by the liquid in the inner chamber, and spirally disposed guiding connections between said float and the fixed inner body adapted to produce rotation of the float as the liquid rises and falls in the inner chamber, the spirality of said connections varying from end to end to thereby produce uniform rotation of said float for uniform variations in the speed of rotation.

3. A speed indicator, comprising an outer rotatable body having a chamber concentric with the axis of rotation, an inner fixed body about which said outer body rotates and also provided with a chamber concentric with the axis of rotation and communicating with the chamber of the outer body and of uniform cross sectional area from end to end, liquid in said chambers adapted to flow from chamber to chamber as the speed of rotation varies, the rise and fall of the liquid in the inner chamber serving to indicate variations in the speed of rotation, a float supported by the liquid in the inner chamber, and spirally disposed guiding connections between said float and the fixed inner body arranged to produce rotating movement of said float as it rises and falls with the liquid in the inner chamber, the spirality of said connections varying from end to end in a manner to produce uniform rotation of said float for uniform variations in the speed of rotation.

4. A speed indicator, comprising a rotatable body having an outer chamber concentric with the axis of rotation, said chamber communicating with an inner chamber also concentric with said axis, the outer chamber having upper and lower wall surfaces lying in parallel planes normal to the axis of rotation, and a liquid in said chambers adapted to flow from chamber to chamber as the speed of rotation varies, the free surface of said liquid traversing both of said parallel plane surfaces of the outer chamber.

5. A speed indicator, comprising an outer rotatable body having a chamber concentric with the axis of rotation, the upper and lower surfaces of said chamber lying in parallel planes normal to the axis of rotation, an inner fixed body about which said outer body rotates and having a chamber concentric with the axis of rotation and communicating with the chamber of the outer body, and a liquid in said chambers rotatable in the outer chamber with said outer body and non-rotatable in said inner chamber and adapted to flow from chamber to chamber as the speed of rotation varies.

6. In a speed indicating device, a revoluble receptacle containing a revoluble portion, of a liquid mass, a non-revoluble portion of said liquid mass, a fixed container for the same, a liquid communication between the said two portions of the liquid mass whereby liquid flows from one to the other as the speed of rotation varies, a float supported by said non-revoluble portion of the liquid mass, spirally disposed guiding connections between said float and said fixed container adapted to produce rotation of the float as said non-revoluble portion of the liquid moves in the fixed container, the spirality of said connections varying in such a manner that the amount of said rotation of the float is directly proportional to the speed of rotation of said receptacle, and indicating means operated by rotation of the float.

7. A speed indicator, comprising an outer rotatable body having a chamber concentric with the axis of rotation, the upper and lower surfaces of said chamber lying in parallel planes normal to the axis of rotation, an inner fixed body about which said outer body rotates and having a chamber concentric with the axis of rotation and communicating with the chamber of the outer body, a liquid in said chambers adapted to flow from chamber to chamber as the speed of rotation varies, a float supported on the liquid in the inner chamber, and spiral guiding connections between said float and the inner body arranged to produce rotation of said float as it rises and falls with the liquid in the inner chamber.

8. A speed indicator, comprising an outer rotatable body having a chamber concentric with the axis of rotation, the upper and lower surfaces of said chamber lying in parallel planes normal to the axis of rotation, an inner fixed body about which said outer body rotates and having a chamber concentric with the axis of rotation and communicating with the chamber of the outer body, a liquid in said chambers adapted to flow from chamber to chamber as the speed of rotation varies, a float supported on the liquid in the inner chamber, and spiral guiding connections between said float and the inner body arranged to produce rotation of said float as it rises and falls with the liquid in the inner chamber, said inner chamber being of uniform cross sectional area from end to end, and the spirality of said guiding connections varying from end to end to produce uniform rotation of said float for uniform variations in the speed of rotation.

9. In speed indicators, wherein a liquid mass is subjected to centrifugal action, wherein the carrier for the mass is formed with spaced-apart and permanently-connected chambers with each chamber carrying a free surface of the mass and with the free surfaces of the mass in permanent communication through the body of the mass, wherein one of the free surfaces is that of a non-rotative portion of the mass body, and wherein the speed indications are made responsive to the changes in position of the latter free surface, an indicating instrumentality operative to translate such indicating surface travel into indications of speed measurement, said instrumentality including a float supported by and in contact with such indicating surface, an indicating element carrying indications representing increments of speed of definite value, and means for operatively connecting said float, the wall portion of such non-rotative portion of the mass body and said element in a manner to translate the rise and fall of such free surface into rotative movement of the element, with the means active to cause movement of the float about its axis by and during the float rise and fall movements, the turning movement being directly proportional to the speed of rotation of the carrier of the mass.

10. An indicator of the type of claim 9 characterized in that element indications are uniformly spaced, and the translating means includes a spiral-like formation arranged to produce the float turning movement, the formation having a configuration to cause compensation for non-uniform lengths of travel of the indicating surface for speed increments of equal amount.

In testimony whereof I affix my signature.

EMERY J. WILSON.